United States Patent [19]

Painter

[11] 3,953,705

[45] Apr. 27, 1976

[54] CONTROLLED ARC GAS HEATER

[75] Inventor: James H. Painter, Winfield, Mo.

[73] Assignee: McDonnell Douglas Corporation, St. Louis, Mo.

[22] Filed: Sept. 3, 1974

[21] Appl. No.: 502,620

[52] U.S. Cl. .............................. 219/121 P; 219/383

[51] Int. Cl.$^2$ .............................. B23K 5/00

[58] Field of Search ............ 219/383, 121 P, 121 R; 313/231.3, 231.4

[56] References Cited

UNITED STATES PATENTS

| | | | |
|---|---|---|---|
| 3,297,899 | 1/1967 | Pratt et al. | 313/231.3 |
| 3,301,995 | 1/1967 | Eschenbach et al. | 219/121 P |
| 3,309,550 | 3/1967 | Wolf et al. | 313/231.3 |
| 3,360,988 | 1/1968 | Stine et al. | 219/121 P X |
| 3,368,397 | 2/1968 | Wochna | 219/121 P X |
| 3,403,277 | 9/1968 | Way et al. | 219/121 P X |
| 3,533,756 | 10/1970 | Houseman | 219/121 P X |
| 3,585,434 | 6/1971 | Kato et al. | 313/231.3 X |
| 3,663,792 | 5/1972 | Fey | 219/121 P |
| 3,832,519 | 8/1974 | Wolf et al. | 219/121 P |

*Primary Examiner*—Arthur T. Grimley
*Assistant Examiner*—G. R. Peterson
*Attorney, Agent, or Firm*—Gravely, Lieder & Woodruff

[57] ABSTRACT

An arc gas heater includes an injector unit having a chamber into which high pressure gas is introduced in a swirl and a constrictor passage leading from the chamber so that the swirling gas flows downstream through the constrictor passage. A rear tubular electrode opens into the chamber with its hollow interior axially aligned with the constrictor passage. The injector unit is separated from a tubular front electrode by interelectrode segments having axially aligned tubular inserts which define a continuation of the constrictor passage beyond the injector unit. Located downstream from the front electrode is a convergent-divergent nozzle. Air flowing subsonically through the constrictor passage assumes a relatively high constant pressure therein, and this high pressure demands a greater difference in electrical potential between the two electrodes to maintain an arc in the passage. This arc elevates the energy of the gas in the constrictor passage to extremely high values. The interelectrode segments are separated by dielectric discs. Adjacent ends of the tubular inserts overlap, yet are separated by air spaces through which secondary air is introduced tangentially to prevent arc-over between segments and to maintain the swirl through the constrictor passage. The swirling air envelopes the arc and confines it to the center of the constrictor passage. The overlap of the insert ends further shields the dielectric discs from arc radiation in the constrictor passage.

9 Claims, 6 Drawing Figures

CONTROLLED ARC GAS HEATER

The Government has rights in this invention pursuant to Contract Number F33615-73-C-3076 awarded by the Department of the Air Force.

BACKGROUND OF THE INVENTION

This invention relates in general to electric arc gas heaters and more particularly to an electric arc gas heater in which the arc is maintained at a substantially fixed length in a region of high pressure to effect a high voltage gradient throughout the length of the arc and thereby transfer maximum energy to the gas stream.

One of the more practical procedures for testing the durability of materials and configurations at high temperatures and velocities, is to place the material or configuration, or at least a scale model of the configuration, in a high velocity-high temperature airstream created by an electric arc gas heater. Basically, such heaters maintain an arc in the air reservoir so that the high energy of the arc is transmitted to the air in the reservoir and elevates the temperature thereof. The heated air is then discharged through a nozzle against the object or configuration well beyond the downstream terminus of the arc.

In some arc heaters, the arc is generally fixed in length, and in these heaters the upstream terminus of the arc is normally a button-like electrode. While fixed length arc heaters deliver energy uniformly to the airstream, the button-like electrode erodes rapidly and hence these heaters are not very durable.

In other arc heaters, the arc is maintained between the interior surfaces of two axially aligned tubular electrodes and as a result the arc is of "natural length." In natural length arc heaters the length of the arc continually varies and likewise so does the energy delivered to the airstream.

U.S. Pat. No. 3,590,219 discloses an electric arc gas heater in which the rear terminus of the arc attaches to a tubular electrode while the front terminus attaches to an upstream electrode along the divergent portion of the nozzle. The throat of this heater is of constant diameter and quite long, and the arc extends the entire length of the throat. Due to the acceleration of the flow through the throat, a substantial pressure gradient exists within it, that is the pressure at the upstream end of the throat is substantially higher than the pressure at the downstream end. Since it is known that the voltage gradient (volts/inch) drops off in proportion to the square root of the pressure (lbs./inch$^2$), the voltage gradient at the downstream end of the arc is substantially less than the voltage gradient at the upstream end and as a result considerably more power (volts × amperes) is delivered to the airstream in the upstream portion of the throat.

SUMMARY OF THE INVENTION

One of the principal objects of the present invention is to provide an electric arc heater having a nozzle capable of discharging gases at supersonic velocities and means for maintaining an arc upstream from the nozzle. Another object is to provide an arc heater capable of discharging gases at extremely high enthalpies. An additional object is to provide an arc heater in which the arc is maintained in a region of relatively high pressure so that a high voltage gradient exists within this region and increased energy is transferred to the air. A further object is to provide an arc heater which permits fixed arc length operation at pressures in excess of 100 atm.

The present invention is embodied in an arc heater having an injector unit provided with a chamber into which pressurized gas is introduced. A rear tubular electrode opens into the chamber and a constrictor passage extends from it to a front tubular electrode. Located downstream from the front tubular electrode is a convergent-divergent nozzle. These and other objects and advantages will become apparent hereinafter.

DESCRIPTION OF THE DRAWINGS

In the accompanying drawings which form part of the specification and wherein like numerals and letters refer to like parts wherever they occur.

DETAILED DESCRIPTION

Figure 1A:
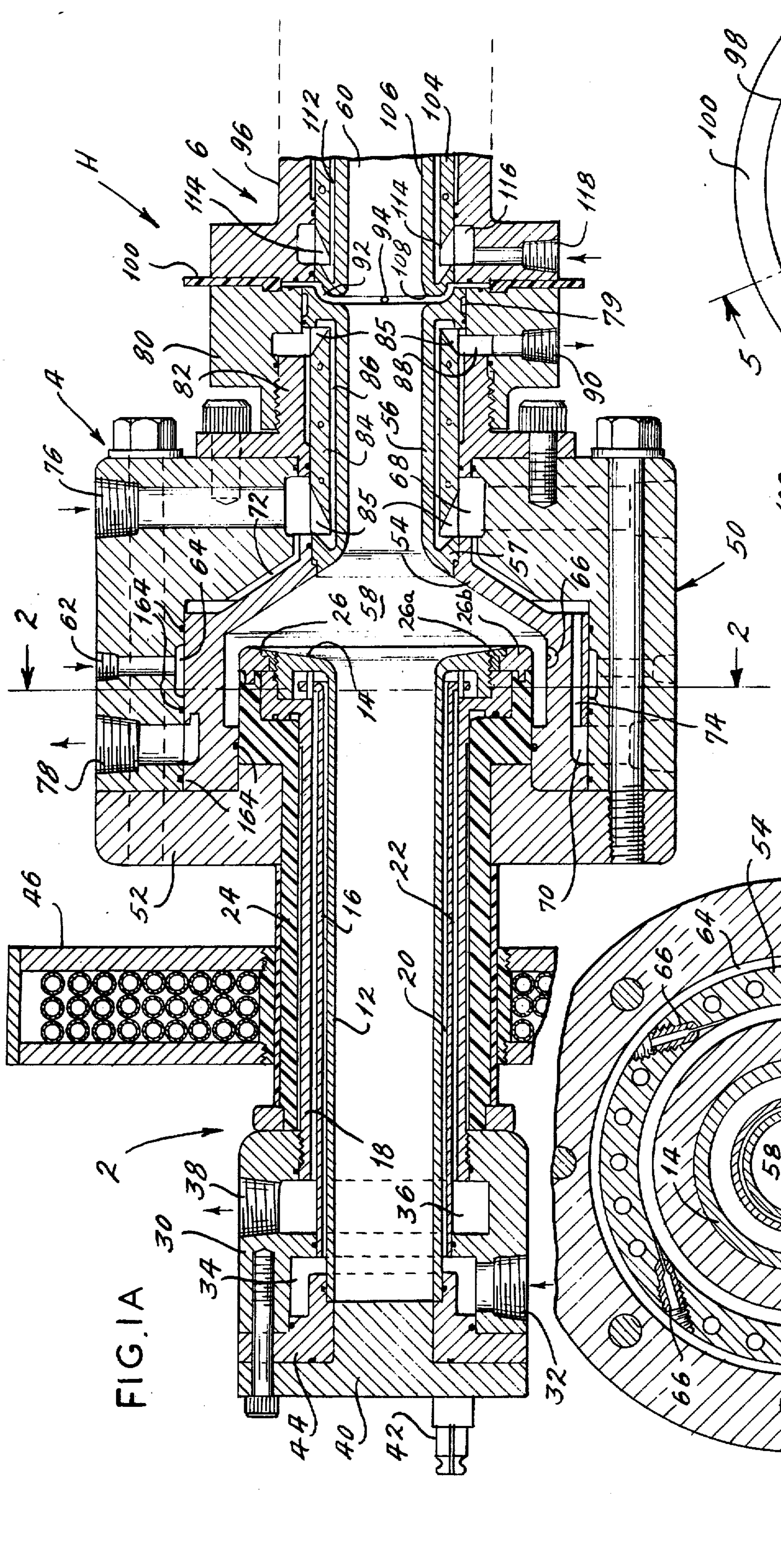
FIG. 1 (FIGS. 1A and 1B) is a longitudinal sectional view of a gas arc heater constructed in accordance with and embodying the present invention.

Referring now to the drawings (FIG. 1), H designates an arc heater which basically includes an upstream or rear electrode assembly 2, a gas injector assembly 4, a plurality of electrically isolated interelectrode segments 6, a downstream or front electrode assembly 8, and a nozzle assembly 10, all arranged in that order from the upstream or rear end of the heater H to the downstream or front end.

The rear electrode assembly 2 (FIG. 1A) includes a tubular electrode 12 which is preferably machined from a high strength-high conductivity oxygen-free copper or copper alloy. Its inside diameter may be 2.0 inches, in which case it should have a wall thickness of 0.1875 inches. The forward end of the electrode 12 is flanged outwardly to form an entrance bellmouth 14. Surrounding the tubular electrode 12 is a thin wall sleeve 16, and the sleeve 16 is in turn encircled by a tubular jacket 18 made preferably from stainless steel. The forward end of the jacket 18 is enlarged and the bellmouth 14 of the tubular electrode 12 threads into this enlarged portion. The sleeve 16 is spaced outwardly from the outer surface of the electrode 12 about 0.060 inches so as to form an interior cooling channel 20, and the jacket 18 is spaced outwardly from the sleeve 16 to form another cooling channel 22. The two annular cooling channels 20 and 22 are in communication adjacent the back side of the bellmouth 14.

The major portion of the tubular jacket 18 is encased in a primary insulator 24 (FIG. 1A) which is preferably made from an epoxy resin laminate of N.E.M.A. grade G-11 and should be capable of sustaining potentials of 25,000 volts with minimum current drainage. The primary insulator 24 flares outwardly at its forward end to receive the outwardly flared portion of the jacket 18 and the bellmouth 14 of the electrode 12. The forward ends of the jacket 18 and the primary insulator 24 are protected by a heat shield 26 which is composed of a flanged inner retaining ring **26*a* which is threaded over the bellmouth 14 and an outer ring 26*b* which is captured between the flange on the inner ring 26***a* and the forward faces of the insulator 24 and jacket 18. Moreover, the outer ring 26*b* has a rearwardly projecting tongue which is received in a groove formed in the primary insulator 24. The inner ring 26*a* is formed from copper, whereas the outer ring 26*b* is formed from Lava which is a hydrous aluminum silicate having a continuous operating temperature of 2,012° F. and a thermal conductivity of 10 Btu/hr.-ft.$^2$ ° F./in.

The rear end of the tubular electrode 12 is contained within a rear housing 30 (FIG. 1A) which threads over the rear end of the tubular jacket 18. The housing 30 has four inlet ports 32 which lead to an annular chamber 34 and the chamber 34 opens into the annular cooling channel 20. The outer annular channel 22, on the other hand, opens into an annular chamber 36 in the rear housing 30 which also has outlet ports 38 in communication with it. The inlet ports 32 are connected with a source of cooling water, so that the water flows into the annular chamber 34 and thence into the annular channel 20, from which it is returned by way of the annular channel 22, the annular chamber 36 and the outlet port 38, in that order. The cooling water should flow within the annular channel 20 at an average velocity of about 140 ft./sec. with the flow rate being 200 gal./min.

The end of the rear housing 30 is closed by an end cap 40 which is bolted to the housing 30 and is provided with power pin receptacles 42. The receptacles 42 are electrically connected with the tubular electrode 12 through the cap 40 and an annular block 44 interposed between the cap 40 and the rear end of the electrode 12. A suitable source of direct current is connected to the pin receptacles 42.

The rear electrode 12 generally midway between its ends is surrounded by a field coil 46 made from 3/16 inch o.d. copper tubing coated with a suitable insulative material such as polyethylene and positioned between relatively thick iron discs. The coil 46 should contain about 27 turns and should operate at 400 to 1000 amperes. The tubing, aside from being connected across a suitable direct current source, is also connected to a supply of cooling water so that the water flows through it and cools the coil 46.

The gas injector assembly 4 receives the front end of the rear electrode 12 (FIG. 14) and includes an injector housing 50 and an annular retainer plate 52 to which the housing 50 is bolted. Both the housing 50 and plate 52 may be formed from stainless steel. The plate 52 fits snugly over primary insulator 24 and holds the housing 50 firmly in position with respect to the upstream electrode assembly 2. The housing 50 contains a liner 54 having a cylindrical portion which surrounds the forward end of the rear electrode 12, being spaced outwardly from the heat shield 26 thereon, and beyond the end of the rear electrode 12 it has a conical section which converges to a constrictor inlet tube 56 provided with flanges at both ends and having an inside diameter of 1.5 inches, which is slightly less than that of the electrode 12. The constrictor inlet tube 56 axially aligns with the rear electrode 12 so that its entrance is located directly ahead of the hollow interior of the rear electrode 12 and the conical portion of the liner 54 is located directly ahead of the bellmouth 14 and heat shield 26 on the rear electrode 12. The liner 54 forms a converging swirl chamber 58 ahead of the rear electrode 12, whereas the inlet tube 56 forms the entrance to a constrictor 60 which leads all the way from the swirl chamber 58 to the nozzle 10. The distance between the bellmouth 14 on the rear electrode 12 and the entrance or rear end of the constrictor 60 may be 1.5 inches. The liner 54 is formed from a high strength copper zirconium alloy such as Amzirc and the constrictor inlet tube 56 is formed from an oxygen-free high thermal conductivity (OFHC) copper or a copper alloy such as copper-zirconium.

Figure 2:
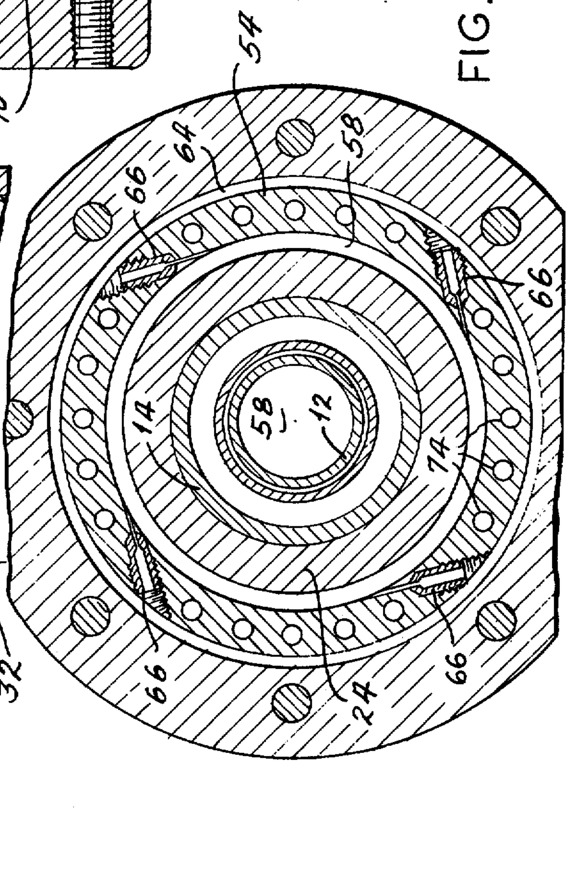
FIG. 2 is a sectional view taken along lines 2—2 of FIG. 1 and showing the primary gas injector nozzles of the injector assembly.

Directly outwardly from the heat shield 26, the housing 50 is sealed against the exterior surface of the liner and this portion of the block 50 is provided with a plurality of primary gas inlet ports 62 which are connected to a source of high pressure air maintained at about 6,000 psi, and these ports open into an annular chamber 64 surrounding the liner 54. The liner 54 in this area is provided with gas injectors 66 (FIG. 2) which are arranged in two circumferential rows or planes spaced axially from each other. Moreover, the injectors 66 are not radial, but are canted so that gas is introduced into the chamber 58 generally tangentially. The injectors 66 in one row are offset in the circumferential direction from the injectors 66 in the other row.

The housing 50 also contains two annular cooling chambers 68 and 70 (FIG. 1A) with the former being at the upstream end of the constrictor sleeve 56 and the latter being at the rear end of the cylindrical portion on the liner 54. The downstream annular chamber 68 opens into spaces between ribs 72 which are formed on the housing 50 and support the liner 54 within the housing 50. The opposite ends of these spaces communicate with the upstream chamber 68 through tubes 74 (FIG. 2) fitted into the cylindrical portion of the liner 54 and extended therein between the various gas injectors 66. Water is supplied to the upstream chamber 68 through several inlet ports 76, and this water flows along the conical section of the liner 54 through the spaces between the ribs 72 and thence through the cooling tubes 74 in the cylindrical portion of the liner 54 to the other annular cooling chamber, from which the heated cooling water is discharged through outlet ports 78. Due to the conical configuration of the flow channels between the ribs 72, the cooling water possesses its greatest velocity immediately after leaving the downstream chamber 68, and this is as it should be because the entrance to the constrictor 60 is the region of highest heating.

While the upstream end of the first constrictor tube 56 is fitted into and supported by the conical portion of the liner 54, the downstream end is projected beyond the injector housing 50 where it is provided with a flange 79 which is received in a mounting ring 80 (FIG. 1A). The ring 80 in turn is threaded over an annular mount 82 which is bolted against the front end of the housing 50. The annular mount 82 surrounds and supports a split water flow guide 84 which is of annular configuration and surrounds the outer surface of the first constrictor tube 56, but is spaced outwardly therefrom a distance of 0.062 inches to create an annular coolant channel 86 around the tube 56. The upstream end of the channel 86 communicates with the annular chamber 68 through tangential end slits 85 in the water flow guide 84, while the downstream end communicates through more slits 85 with a smaller annular chamber 88 in the mounting ring 80. The chamber 88 is supplied with cooling water through ports 76 in the injector housing 50. Thus, cooling water which enters through the inlet ports 76 in the housing 50, in addition to flowing along the liner 54, also flows through the annular channel 86 to cool the constrictor tube 56 with this cooling water being discharged through the outlet ports 90.

The downstream flange 79 on the end of the first constrictor tube 56 is provided with a shallow recess or gap 92 of cylindrical configuration and tangential orifices 94 which open into the gap 92. Moreover, the outer surface of the downstream flange 79 is grooved so that the orifices 94 are all at the same pressure. The orifices 94 are supplied with secondary pressurized air through ports (not shown) in the mounting ring 80. This air enters the constrictor 60 in a swirl and tends to sustain the swirl generated by the primary gas in the swirl chamber 58. The gap 92 is larger in diameter than the bore of the tube 56, yet is coaxial therewith.

Figure 4:
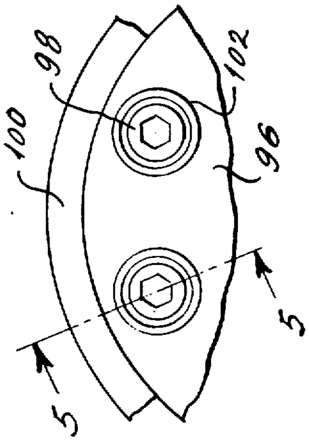
FIG. 4 is a fragmentary end view of a typical flange of an interelectrode segment.
Figure 5:
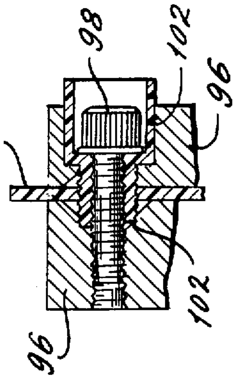
FIG. 5 is a sectional view taken along lines 5—5 of FIG. 4.

The interelectrode segments 6 (FIGS. 1A and 1B) are interposed between the gas injector assembly 4 and the nozzle 10 and each is identical in construction although their length may vary. The first interelectrode segment 6 includes a housing 96 having flanges at its ends and the upstream flange is bolted securely against the mounting ring 80 by bolts 98 (FIGS. 4 and 5) which pass through the housing flange and thread into the ring 80. Interposed between the opposed faces of the ring 80 and the rear flange of the segment housing 96 is insulator disc 100 made from a dielectric material such as DELRIN plastic. Such discs should be at least 0.060 inches thick and capable of sustaining 5,000 volts without significant current drainage or arc-over. The bolt holes through the end flange on the segment housing 96 are lined with insulator sleeves 102 (FIG. 5) made of the same dielectric material and having the same thickness. The sleeves 102 project through the discs 100 and thread into the mounting ring 80. They receive not only the shanks of the bolts 98, but also the heads, and indeed the bolt heads are completely contained within the sleeves 102. The discs 100 and sleeves 102 completely isolate the injector housing 4 from the first interelectrode segment 6 in an electrical sense so that a large potential difference on the order of 5,000 volts may be maintained between the two without arc-over.

The segment housing 96 has a central bore which contains a water flow guide 104 made from a suitable metal such as aluminum, and the water flow guide 104 in turn surrounds a tubular insert 106 which is preferably made from OFHC copper or zirconium alloy. These cooled inserts can withstand extremely high heating rates. The ends of the tubular insert 106 are flared outwardly with the upstream end forming an upstream flange 108 which projects into the segment gap 92 at the end of the constrictor inlet tube 56, the projection being far enough to shield the inner margin of the insulator disc 100 from the arc radiation emanating from the constrictor 60. The upstream flange 108 is spaced from the surfaces of the preceding downstream flange 79 so that air injected through the secondary orifices 94 in the flange 79 can flow through that space and join the flow of primary air through the constrictor 60. The downstream end of the insert 106 has a flange 110 identical to the flange 79 on the constrictor inlet tube 56. Thus, the flange 110 likewise has a gap 92 and orifices 94. The upstream flange 108 and downstream flange 110 of the tubular insert 106 fit snugly into the segment housing 96 and this serves to position the insert 106 radially within the housing 96 such that a narrow water channel 112 (FIG. 1B) exists between the exterior surface of the tubular insert 106 and the interior surface of the water flow guide 104. At its ends the water flow guide 104 is provided with tangential slits 114 which provide communication between the water channel 112 and annular water chambers 116 formed in the segment housing 96. The upstream chamber 116 is supplied with water through an inlet port 118 in the flange at that end of the segment housing 96, and water introduced into the port 118 flows through the upstream chamber 116 and tangential slits 114 to the water channel 112 and thence along the channel 112, leaving it through the downstream slits 114, the downstream chamber 116, and outlet ports 120 opening for that chamber 116. The outlet ports 120 extend radially through the downstream flange on the segment housing 96.

The downstream flange on the segment housing 96 is further provided with a secondary air inlet port 122 (FIG. 3) which leads to the annular groove in the flange 110 on the downstream end of the tubular insert 106 so that air which flows into the port 122 and groove will be discharged generally tangentially into the constrictor 60 through the orifices 94 in the flange 110, just as the air which flows into the secondary air port of the mounting ring 80 on the injector housing 56 flows into the constrictor 60 further upstream. The swirl generated by this secondary air is the same direction as the swirl generated in the swirl chamber 58 and tends to sustain that swirl.

Figures 1B, 3:
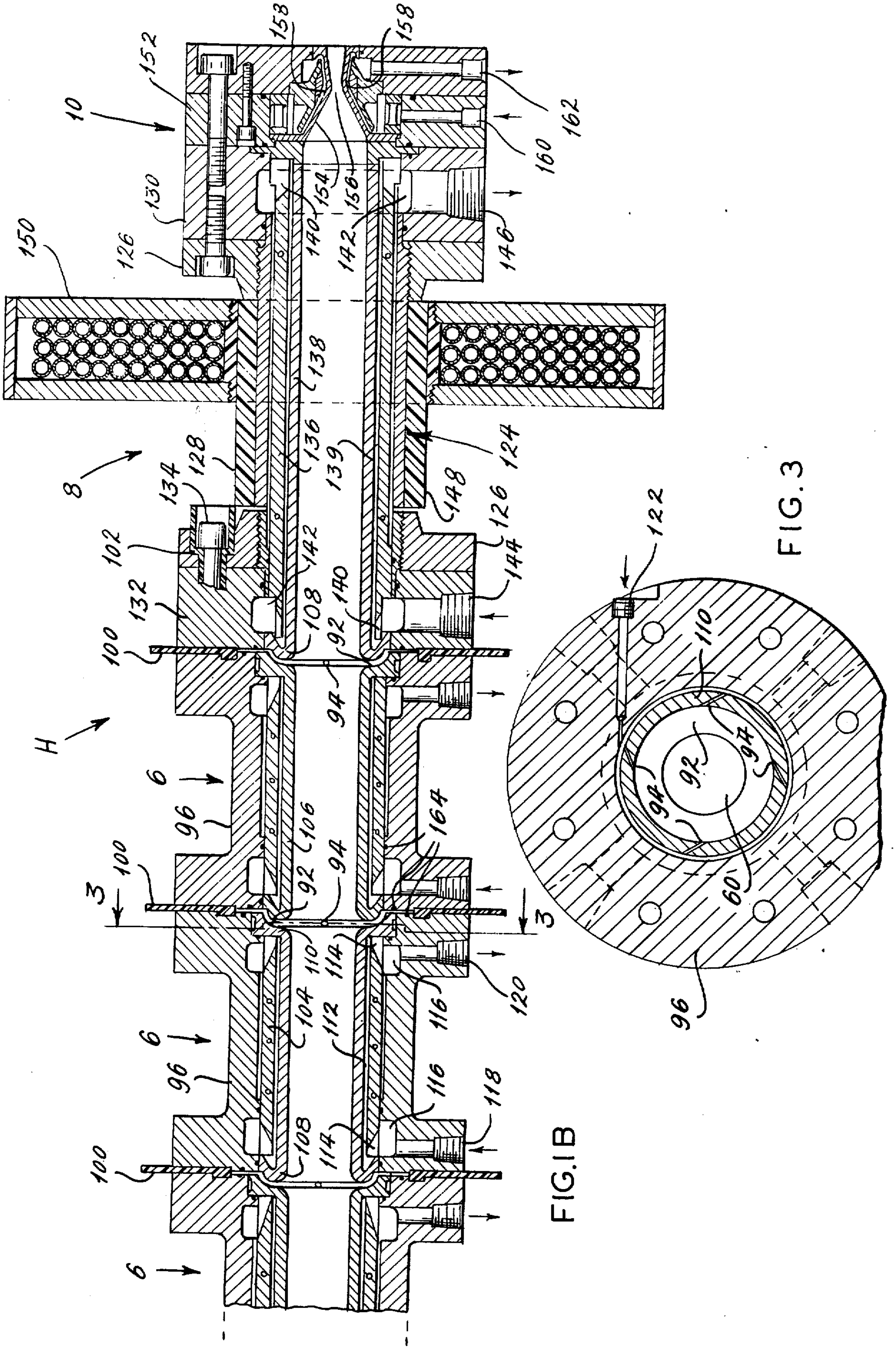
FIG. 3 is a sectional view taken along lines 3—3 of FIG. 1 and showing ports for injecting secondary gas.

Each subsequent interelectrode segment 6 is bolted against the segment 6 which precedes it in the same manner as the first is bolted against the mounting ring 80 of the gas injector 4 (FIG. 1B). Hence, the upstream flanges 108 on the tubular inserts 106 project into the segment gaps 110 on the preceding inserts 106 with a slight spacing existing between them for the passage of the air injected through the orifices 94 in the flanges 110 of the preceding inserts 106. Since the orifices 94 are oriented tangentially, the secondary air enters each subsequent tubular insert 106 with a swirling effect.

The front or downstream electrode assembly 8 (FIG. 1B) is secured firmly to the endmost interelectrode segment 6, and it includes a stainless steel electrode housing 124 composed of a pair of end rings 126 threaded over the end of a sleeve 128 and front and rear end blocks 130 and 132 abutted against the rings 126. The rear end block 130 is clamped against the flange on the housing 96 of the endmost interelectrode segment 6 with an insulator disc 100 interposed between that flange and the block 132, the clamping being effected by bolts 134 which extend through the rear end ring 126, the rear block 132, the insulator disc 100 and thread into the flange of the endmost housing 96. The portions of the bolts 134 located within the housing 124 and the insulator disc 100 are contained within the insulator sleeves 102. The endmost insulator disc 100 and sleeves 102 serve to electrically isolate the front electrode assembly 8 from the adjacent interelectrode segment 6 and prevent arc-over between the two.

The electrode housing 124 contains a water flow guide 136 (FIG. 1B) which is made from a suitable metal such as aluminum and extended through the guide 136 is a front tubular electrode 138 which is preferably made from OFHC copper or a copper alloy. The inside diameter of the electrode 138 can be the same as that of the constrictor inlet tube 56 in the injector assembly and the tubular inserts 106 of the interelectrode segments 6 or it can be larger. The preferred diameter is greater to insure proper arc attachment. The wall thickness of the front electrode 138 is 0.10 inches. The electrode 138 has an upstream flange 108 projecting into the end tubular insert 106 such that a slight gap 92 exists between the ends of the insert 106 and the tubular electrode 138 to permit secondary air from the last air inlet port 112 to flow in a swirl pattern into the interior of the tubular electrode 138. The flanged ends of the electrode 138 fit snugly into end blocks 130 and 132 and are thus radially positioned such that inside surfaces of the split ring 104 is positioned outwardly from the outside surface of the tubular electrode 138 and an annular water channel 139 is formed between those surfaces. The channel 139 should pass cooling water at a flow velocity of at least 110 ft./sec.

The ends of the liner 136 are provided with tangential slits 140 which are located at the annular chambers 142 in the front and rear end blocks 130 and 132 of the electrode housing 124. The rear end block 132 has an inlet port 144 which opens into the annular chamber 142 therein so that water introduced into the port 144 flows from the chamber 142 through the slits 140 and into the annular channel 139. The water leaves the channel 139 through the slits 140 at the opposite end of the liner 136 and thereafter flows into the other annular chamber 132 and thence out an outlet port 146.

Surrounding the sleeve 128 of the electrode housing 124 is an insulator 148 which is clamped in position between the end rings 126. The insulator 148 supports a front coil 150 which is similar in construction to the rear coil 46, only 30 turns of 5/16 inch diameter are employed.

The nozzle assembly 10 (FIG. 1B) includes a housing 152 which is bolted firmly against the front end ring 126 of the front electrode housing 124. The nozzle housing 152 contains a convergent-divergent nozzle 154 which is preferably made from a copper-zirconium alloy such as Amzirc. The nozzle 154 is positioned at the end of the constrictor 60 and is axially aligned therewith. Being of the convergent-divergent variety, the nozzle 154 accelerates the flow of air to the sonic velocity within the throat 156 thereof, which is smaller in diameter than the constrictor 60, and within the divergent portion beyond the throat 156 the air is accelerated still further to supersonic values which may range as high as Mach 3.2, depending on the exact configuration of the nozzle 154. The wall thickness of the nozzle 154 at its throat 156 should be 0.0625 inches and substantially the entire nozzle 154 is surrounded by a water channel 158 fed through an inlet port 160 and discharged through outlet ports 162, both of which are in the housing 156. The velocity of the water within the channel may reach as high as 250 ft./sec. and even at that velocity nucleate boiling heat transfer is required to dissipate the heat.

To prevent leakage of gas and cooling water, O-ring seals 164 (FIGS. 1A and 1B) are installed between the parts. At high temperature locations (above 250° F.) silicone O-rings should be used for seals 164, whereas at lower temperatures (below 250° F.) BUNA-N O-rings will suffice.

OPERATION

The arc heater H is mounted firmly on a concrete base with its nozzle 154 opening into the end of a duct (not shown) in which a test specimen or configuration is positioned.

To initiate operation of the heater H, the high pressure cooling water is first circulated through the device so that once the arc is established in the constrictor passage 60 the water will dissipate enough heat to prevent the heater from being destroyed. In particular, high pressure cooling water is supplied to the inlet ports 32 of the rear electrode assembly 2 and this water passes through the concentric channels 20 and 22 and cools the rear electrode 12. More pressurized water is supplied to the inlet ports 76 of the injector housing 50, and this water flows along the liner 54 between the ribs 72 and thence through the cooling tubes 76 to the outlet port 78. The water supplied through the inlet ports 76 also flows in the opposite direction through annular channels 86, thus cooling the constrictor inlet tube 56. The several interelectrode segments 6 are cooled by water supplied through their inlet ports 118, and this water flows along the tubular insert 106 thereof, cooling the same. Still more high pressure water is supplied to the inlet ports 144 of the front electrode assembly 8, and this water flows through the channels 139 and cools the tubular electrode 138. Finally, the nozzle assembly 10, which is the hottest portion of the entire heater H is cooled by water supplied through its inlet port 160, and this water flows at very high velocity through the water channel 158 which surrounds convergent-divergent nozzle 154. Notwithstanding the high velocity, nucleate boiling heat transfer is necessary in order to dissipate the heat from the nozzle 154. The water flow through each of the annular channels is adjusted by controlling the back pressure beyond the respective outlet ports. More cooling water passes through the tubes of the front and rear field coils 46 and 150 to cool them. These coils 46 and 150 are further placed across a suitable D.C. potential which as adjusted to provide the desired current flow through them.

Once the flow of cooling water is established and the field coils 46 and 150 are energized, argon gas is supplied to the gas inlet ports 62 of the injector housing 50 at relatively low pressure, and this gas flows into the swirl chamber 58 through the gas injectors 66. The inert gas fills the rear tubular electrode 12 and likewise flows downstream through the constrictor 60, front electrode 138, and nozzle 154. Since the argon flow rate is low and not arc-heated, little pressure build-up occurs in the constrictor passage 60 and the velocity of the gas in the throat 156 of the nozzle is subsonic.

Once the flow of argon is established, a D.c. potential of about 20,000 volts is placed across two tubular electrodes 12 and 138. In this regard, it is generally desirable to have the rear electrode 12 serve as the anode with the electrical energy source being connected to the pin receptacle 42. The front electrode 138 is grounded. The potential difference is increased until a breakdown in the form of a short arc occurs between the retainer ring 26*a* of the heat shield 26 and the liner 54. This breakdown is sensed as a flow of current through the rear electrode 12.

At the instant spark breakdown occurs, high pressure air is supplied to the gas inlet ports 62 of the injector assembly 4 and more air is supplied to the secondary air inlet ports 122 of the interelectrode segments 6, but at lower pressure. The air may be supplied through a fast acting valve responsive to the flow of current in the leads to the rear electrode 12. In any event, once the flow of air is established, the supply of argon is cut off so that only air flows into the arc heater H.

The air which flows into gas inlet ports 62 flows into the annular chamber 64 from which it is discharged into the swirl chamber 58 through the injectors 66. Since the injectors 66 are oriented generaly tangentially, the air swirls through the chamber 58 and into the constrictor 60 where the swirling is maintained. Since the rear electrode 12 possesses a greater interior diameter than the constrictor passage, some of the high pressure air from the swirl chamber 58 is diverted into the rear electrode. The flow of air through the swirl chamber 58 and into the rear electrode 12 causes the rear terminus of the arc to move off of the heat shield retainer ring 25*a* and into the interior of the rear electrode 12, whereas the flow of a much greater quantity into the constrictor passage 60 causes the front terminus to move downstream through the passage 60 and attach to the interior of the front electrode 138.

The air supplied to the secondary inlet ports 95 and 122 of the injector assembly 4 and interelectrode segments 6, respectively, is injected tangentially into the constrictor passage 60 through the orifices 94, and this air tends to maintain the swirl through the constrictor 60. It also reduces the tendency to arc over between interelectrode segments 6 or between the front electrode assembly 8 and the forwardmost interelectrode segment 6 inasmuch as it reduces the number of charge carriers in these regions which are the regions where arc-over is most likely to occur.

The swirling path of air through the swirl chamber 58 and the constrictor 60 confines the arc to the center regions of those tubes. The swirling air envelopes the arc and prevents it from touching the tubes 56 and tubular inserts 106.

The swirling air stays well below sonic velocity in the swirl chamber 58 and the constrictor passage 60, being usually around Mach 0.05. The gas is at a relatively high pressure on the order of 1500 psig or greater. Moreover, the pressure through the constrictor passage 60 remains relatively constant and as a result large potentials are required to maintain the arc through the constrictor passage 60. Since the voltage gradient is proportional to the square root of the pressure the total power input is increased by maintaining a long high pressure arc. The increased power input increases the net energy transferred to the air, and consequently when it reaches the nozzle 154 the air has an extremely high enthalpy.

The coils 46 and 150 rotate the arc terminal so that excessive errosion does not occur. They also tend to stabilize the ends of the arc in the axial direction to avoid excessive axial movement with the consequent fluctuations in energy transferred to the air. Also, the front coil 150 prevents the arc from passing into the nozzle 154.

Within the throat 156 of the nozzle 154, the airstream reaches the sonic velocity, and in the divergent portion beyond the throat 156 the airstream is accelerated to supersonic velocities. The test specimen is located beyond the nozzle 154 where the heated supersonic airstream impinges against it.

This invention is intended to cover all changes and modifications of the example of the invention herein chosen for purposes of the disclosure which do not constitute departures from the spirit and scope of the invention.

What is claimed is:

1. An arc gas heater comprising: an injector unit having an enlarged chamber of circular cross section therein and means for injecting primary gas into the chamber at the periphery thereof; a tubular rear electrode attached to the injector unit and projecting rearwardly therefrom with the hollow interior of the electrode opening into the chamber, the diameter of the electrode being substantially less than the diameter of the chamber; a dielectric element located between the rear electrode and the injector unit to electrically isolate the rear electrode for the injector unit; a plurality of interelectrode segments arranged one after the other and projecting forwardly from the injector unit, the interelectrode segments having hollow interiors which define a constrictor passage which communicate with the chamber and axially aligns with the tubular rear electrode, the diameter of the constrictor passage being substantially less than the diameter of the chamber in the injector unit and also substantially less than the length of each interelectrode segment, the diameter of the constrictor passage further being substantially constant throughout its length so that gas will flow through the constrictor passage at a relatively high and substantially constant pressure; a front electrode attached to the forwardmost interelectrode segment and having a hollow interior which aligns with the constrictor passage, the hollow interior of the front electrode being substantially the same diameter as the constrictor passage so as to form a continuation of the constrictor passage; a nozzle located at the forward end of the tubular front electrode and having a throat which is axially aligned with the constrictor passage, the throat having a diameter which is substantially less than that of the constrictor passage so that the gas may accelerate to the sonic velocity within the throat; dielectric discs located between adjacent interelectrode segments and between the rearmost segment and the injector unit and the forwardmost segment and the front electrode so that the interelectrode segments are electrically isolated from one another as well as from the injector unit and the front electrode, means for introducing secondary gas into the constrictor passage from the periphery thereof generally in the regions where adjacent interelectrode segments are contiguous, whereby a potential placed across the two electrodes will cause an arc to extend through the constrictor passage with the termini of the arc being at the electrodes and the arc will transfer energy to the high pressure gas in the constrictor passage, imparting high enthalpy to that gas before it is accelerated to the sonic velocity in the throat.

2. An arc heater according to claim 1 wherein the gas injector unit includes a housing having ribs on its inside face, a liner located in the housing against the ribs therein, the liner defining the chamber, and means for directing cooling water into the spaces between the ribs for cooling the liner.

3. An arc heater according to claim 1 wherein the injector unit includes a housing and a liner within the housing with the liner defining the chamber, and wherein the means for injecting gas into the chamber includes injectors in the liner, an annular chamber within the housing surrounding the rear ends of the injectors, and at least one port in the housing and leading to the annular chamber.

4. An arc heater according to claim 3 wherein the injectors are arranged in two circumferential rows which are spaced axially from each other.

5. An arc heater according to claim 1 and further comprising electrical insulative primary insulator sleeve means surrounding the rear electrode and a heat shield at the front end of the electrical insulative sleeve means and exposed to the chamber, the heat shield being radially retained on the sleeve means and axially retained on the rear electrode, whereby disintegration from cracking is prevented.

6. An arc heater according to claim 1 wherein the rear electrode is surrounded by an electrical insulative primary insulator sleeve; wherein a thermal insulative material is mounted on a metal retaining ring which is fastened to the forward end of the rear electrode and retains the thermal insulative material in both radial and axial directions; and wherein the thermal insulative material includes an axial projection which extends into the electrical insulative sleeve for further retaining the thermal insulative material in the radial direction.

7. An arc heater according to claim 1 and further including a field coil encircling the front electrode for stabilizing the front terminus of the arc in the axial direction.

8. An arc gas heater according to claim 1 wherein each interelectrode segment has a tubular insert through which the constrictor passage extends and a cooling channel which surrounds the insert to dissipate heat therefrom; and wherein the injector unit has a constrictor tube which leads from the chamber and forms the beginning of the constrictor passage, the injector unit further having a cooling channel which surrounds the constrictor tube to dissipate heat therefrom.

9. An arc heater according to claim 8 wherein the constrictor tube and the tubular inserts have at their downstream ends flanges provided with sockets which receive the upstream ends of the adjacent tubular inserts, and wherein the flanges have orifices extending through them for supplying the secondary gas to the spaces at the ends of the inserts.

* * * * *